(12) United States Patent
Johansson

(10) Patent No.: US 8,150,480 B2
(45) Date of Patent: Apr. 3, 2012

(54) DEVICE WITH RETRACTED FRONT FACE

(75) Inventor: Panu Mårten Jesper Johansson, Tampere (FI)

(73) Assignee: Nokia Corporation, Espoo (FI)

( * ) Notice: Subject to any disclaimer, the term of this patent is extended or adjusted under 35 U.S.C. 154(b) by 596 days.

(21) Appl. No.: 12/331,934

(22) Filed: Dec. 10, 2008

(65) Prior Publication Data

US 2010/0142127 A1 Jun. 10, 2010

(51) Int. Cl.
*H04M 1/00* (2006.01)
(52) U.S. Cl. .................. 455/575.1; 455/575.4; 455/565; 455/550.1
(58) Field of Classification Search ............... 455/575.4, 455/565, 550.1, 575.1
See application file for complete search history.

(56) References Cited

U.S. PATENT DOCUMENTS

| | | |
|---|---|---|
| 3,400,226 A | 9/1968 | Krumreich et al. |
| 4,791,526 A | 12/1988 | Breu et al. |
| 5,731,808 A | 3/1998 | Gaither |
| 7,071,844 B1 | 7/2006 | Moise |
| 2004/0198243 A1 | 10/2004 | Tasy et al. |
| 2006/0061946 A1 | 3/2006 | Vick |
| 2006/0205450 A1* | 9/2006 | Amano et al. ............. 455/575.4 |
| 2007/0047228 A1 | 3/2007 | Thompson et al. |
| 2007/0047261 A1 | 3/2007 | Thompson et al. |
| 2007/0047262 A1 | 3/2007 | Schardt et al. |
| 2007/0129097 A1* | 6/2007 | Arihara ....................... 455/550.1 |
| 2007/0184877 A1* | 8/2007 | In et al. ........................... 455/565 |
| 2008/0081678 A1* | 4/2008 | Ko ............................. 455/575.4 |

FOREIGN PATENT DOCUMENTS

| | | |
|---|---|---|
| CN | 2831238 Y | 10/2006 |
| EP | 1014295 | 6/2000 |
| EP | 1527801 | 5/2005 |
| JP | 08-212868 | 8/1996 |
| KR | 20030090549 | 11/2003 |
| WO | 8502276 | 5/1985 |
| WO | 9808241 | 2/1998 |

OTHER PUBLICATIONS

Written Opinion of the International Preliminary Examining Authority dated Jan. 28, 2011 from PCT Application No. PCT/FI2009/050761, 8 pages.
Written Opinion of the International Preliminary Examining Authority dated Dec. 8, 2009 from PCT Application No. PCT/FI2009/050761, 10 pages.
Romaine, My Impressions of the Motorola Timeport and ST7867W, http://www.arcx.com/sites/Motorola%20Timeport.htm Last updated: Oct. 5, 2000, p. 1-5, printed from the internet May 27, 2009.
Press Release, "The Nokia 8110—A New Generation Mobile Phone", published Sep. 9, 1996, retrieved from internet site, http://press.nokia.com/PR/199609/776225_5.html>, complete document.
"The Nokia 81XX range of Matrix slide phones", retrieved Nov. 16, 2009 from the internet site, http://www.retrobrick.com/81102.html>, figures only.

* cited by examiner

*Primary Examiner* — Jean B Jeanglaude
(74) *Attorney, Agent, or Firm* — Hollingsworth & Funk, LLC

(57) ABSTRACT

A device with a front face such as an operating face, including elements of the user interface of the device is provided. A major part of the front face is concave so that the front face is retracted and thereby protected from being scratched.

17 Claims, 2 Drawing Sheets

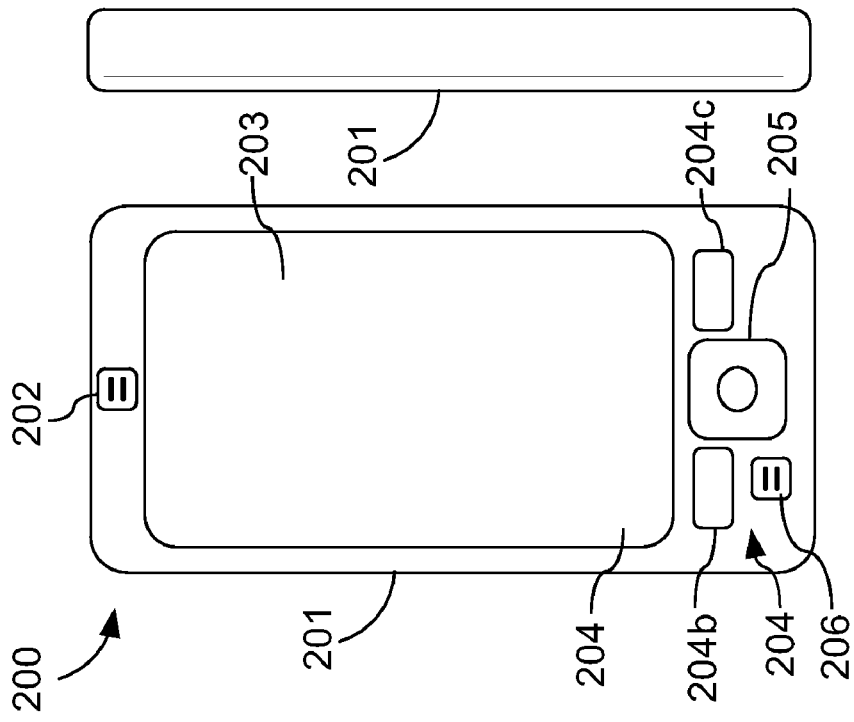
Fig 2
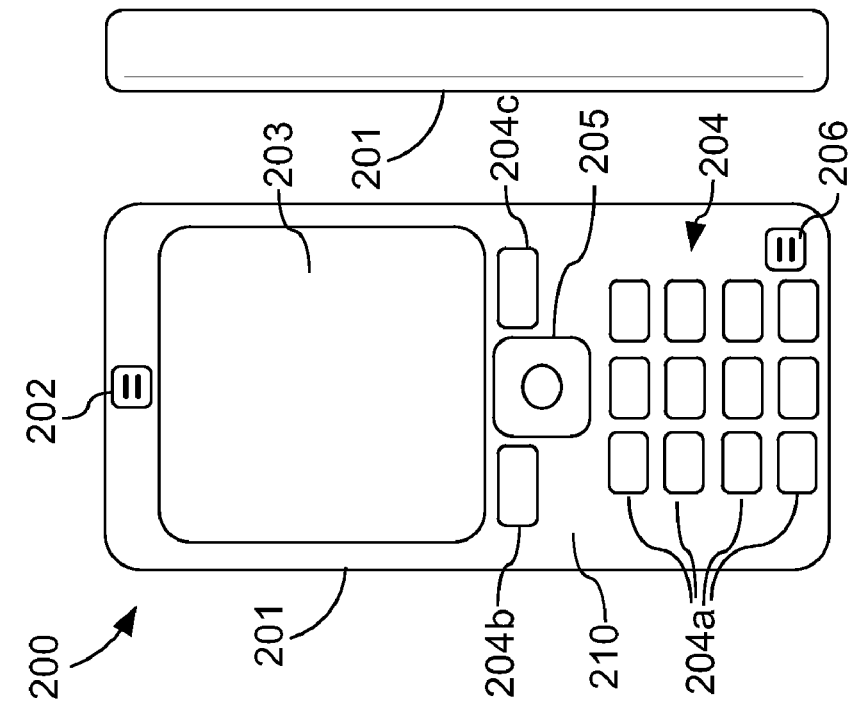
Fig 1
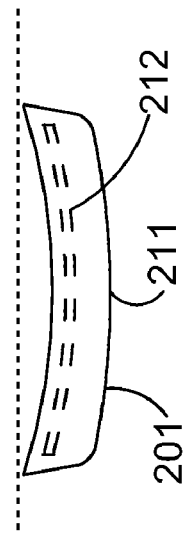

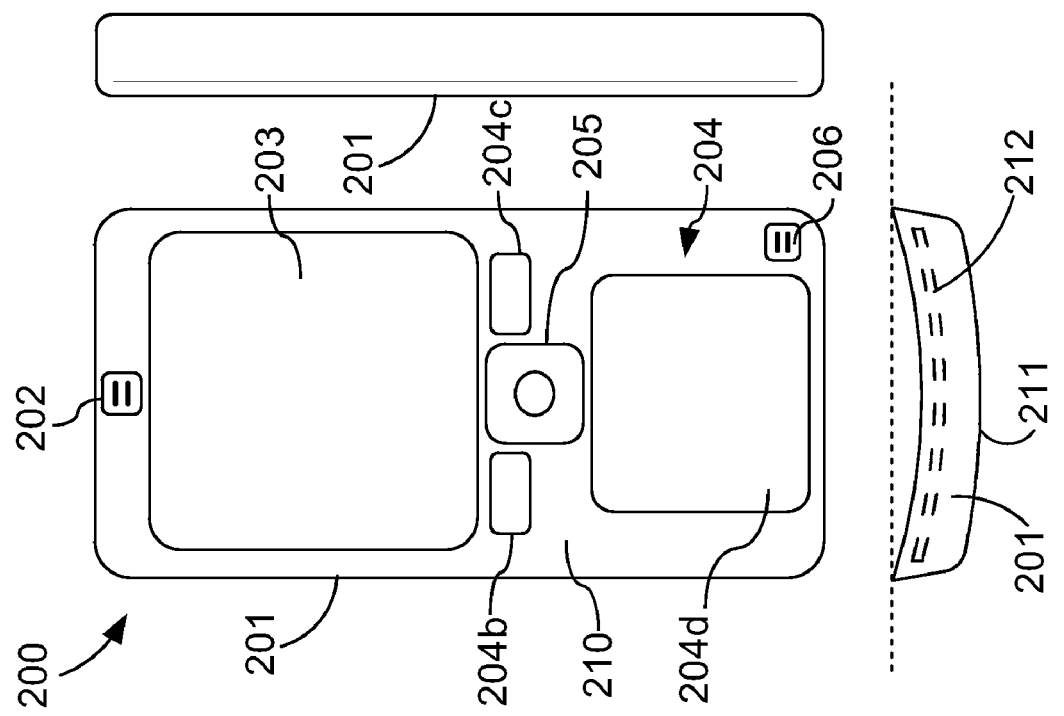

DEVICE WITH RETRACTED FRONT FACE

FIELD

The present application relates to a device with a front face, in particular with front face that is an operating face that is provided with user-interface elements.

BACKGROUND

Mobile electronic devices, such as mobile phones, media players and personal digital assistants are products that sometimes are used and handled roughly and therefore exposed to being scratched. The materials used for the faces of such devices are typically plastics that do not have a very high scratch resistance. The recent trend towards thinner devices has aggravated this problem. In particular the display screens get scratched when the devices are carried in pant pockets or in purses. Fold phones provide a solution to this problem, but not all users are fond of this shape of housing. Scratch resistant materials such as sapphire glass are expensive and heavy. Scratch resistant coatings provide some alleviation but are not always sufficient.

SUMMARY

By providing a device having a concave front face the risk of the front face being scratched by other objects is reduced.

The disclosed exemplary embodiments provide a device in which at least a major portion of the front face is concave.

In one embodiment the front face has a first extent and a second extent and the operating face is concave in at least one of the extents. The first extent may be larger than the second extent and the front face may be concave in the direction of the second extent.

In an embodiment the front face is a retracted surface that extends from edges of the front face that are substantially disposed in the direction of the first extent.

In another embodiment the housing of the device comprises a curved panel with a concave front face and a convex rear face.

Further objects, features, advantages and properties of device according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which:

FIG. 1 is an isometric view of a device according to a first embodiment,

FIG. 2 is an isometric view of a device according to a second embodiment, and FIG. 3 is an isometric view of a device according to a third embodiment.

DETAILED DESCRIPTION

In the following detailed description, the device according to the teachings for this application in the form of a cellular/mobile phone will be described by the embodiments. It should be noted that although only a mobile phone is described the teachings of this application can also be used in any other electronic device such as in portable electronic devices such as laptops, PDAs, mobile communication terminals, media players, navigation devices, cameras, electronic books and notepads and other electronic devices offering access to information.

A first embodiment of the mobile terminal 200 is illustrated in FIG. 1. The mobile terminal 200 comprises a housing 201 with a front face 210 that is provided with a speaker or earphone 202, a microphone 206, a main or first display screen 203 and a keypad 204 which may include a keypad 204*a* of common ITU-T type (alpha-numerical keypad representing characters "0"-"9", "*" and "#") and certain other keys such as soft keys 204*b*, 204*c* and a joystick 205 or other type of navigational input device such as a navigation key. The front face 210 is an operating face that includes several of the elements of the user interface.

In the present embodiment the front face 210 has a first extent from the top of the device where the speaker 202 is located to the bottom of the device 200 where the microphone 206 is located, i.e. the long extent of the housing 201 and a second extent that in the drawings ranges from the left side of the housing 201 to the right side of the housing 201, i.e. the short extent of the housing 201. The front face 201 is concave in the direction of the second extent. The rear surface 211 is convex and thereby the housing 201 of the mobile phone 200 has the shape of a curved panel with a substantially uniform thickness.

In this embodiment the front face 210 is actually concave cylindrical, but it should be noted that the curvature front face 210 does not need to be perfectly cylindrical and that any other curvature that ensures that the front face 210 is retracted to protect it from being scratched during use. The long edges of the housing 201 form the "highest" points of the front face 210. The long edges of the front face 210 are this embodiment substantially straight and the short edges of the front face are curved and have substantially the same curvature as the front face 210. It should be noted that the long sides of the front face can be curved in any direction as long as they still form the "highest" point of the front face 210.

In the present embodiment the display screen 203 is concave and has substantially the same curvature as the front face 210. Alternatively, only the surface of the display screen is concave and the display itself is planar.

The keypad 204 is also concave and has substantially the same curvature as the front face 210. The whole keypad 204 can be curved, including the shape of the top surfaces of the keys. Alternatively, the top faces of the keys are conventionally shaped (curved, convex or planar but not following the curvature of the operating face) and only the spatial arrangement of the keys follows the curvature of the front face 210.

The outlet of the speaker 202 is also concave and has substantially the same curvature as the front face 210.

The internal components, software and protocol structure of the mobile terminal 200 will not be described in detail since such technology is generally well known. However, the printed wired board 212 is adapted to the shape of the front face 201. The printed wired board 212 is a curved panel with a curvature that substantially matches the curvature of the front panel 201. Thus, assembly of the curved display 203 and the curved keypad 204 is facilitated, since their curvature substantially matches that of the printed wired board 212 and the keypad 204 and the display screen 203 can therefore be directly secured to be printed wired board 212. Alternatively, the printed board can be a conventional planar board and the UT components are provided with a planar back for mounting on the printed wired board or adapters are used for mounting the curved components on the planar printed wired board.

A second embodiment of the mobile terminal 200 is illustrated in FIG. 2. The mobile terminal 200 according to the second embodiment is essentially identical to the mobile terminal according to the first embodiment, except that the front face is provided with a larger display 203 that is of the touch type, i.e. it is a touchscreen and the keypad 204 does not comprise an alphanumerical set of keys. The shape of the housing 201, of the front face 210, and of the user-interface elements on the front face 210 is essentially identical to the shape of the corresponding elements of the mobile phone according to the first embodiment.

A third embodiment of the mobile terminal 200 is illustrated in FIG. 3. The mobile terminal 200 according to the third embodiment is essentially identical to the mobile terminal according to the first embodiment, except that the alphanumerical set of keys is replaced by a touch pad 204d. In the shape of the housing 201, of the front face 210, and of the user-interface elements on the front face 210 is essentially identical to the shape of the corresponding elements of the mobile phone 200 according to the first embodiment, i.e. the front face is provided with a concave touchpad 204d with the curvature of the touchpad substantially matching the curvature of the front face 210.

The front face and the user-interface elements thereon can in an embodiment be made from scratch resistant materials, thereby rendering the front face even more resistant to being scratched.

The various aspects of what is described above can be used alone or in various combinations. It should be noted that the teaching of this application is not limited to the use in mobile communication terminals such as mobile phones, but can be equally well applied in Personal digital Assistants (PDAs), game consoles, media players, personal organizers or the like.

The teaching of the present application has numerous advantages. Different embodiments or implementations may yield one or more of the following advantages. It should be noted that this is not an exhaustive list and there may be other advantages which are not described herein. For example, one advantage of the teaching of this application is it provides for a device with a front face that is less vulnerable to being scratched. It is another advantage of the present invention that it provides for an ergonomic front face shape. It is yet another advantage of the present invention that it provides for a device with a slim and ergonomic housing shape.

Although the teaching of the present application has been described in detail for purpose of illustration, it is understood that such detail is solely for that purpose, and variations can be made therein by those skilled in the art without departing from the scope of the teaching of this application. For example, the device has been described with a housing that is a substantially rectangular panel, but it is understood that the panel does not need to be rectangular, the outline of the housing could have any other suitable shape that is used in these kinds of devices. Further, the device has been described with a housing that is in one piece, but it should be understood that the teaching can also be applied to devices that have several housing parts, such as known from slide- and fold- and twist phones.

For example, although the teaching of the present application has been described in terms of a mobile phone, it should be appreciated that the teachings of the present application may also be applied to other types of electronic devices, such as media players, palmtop computers and the like. It should also be noted that there are many alternative ways of implementing the methods and apparatuses of the teachings of the present application.

Features described in the preceding description may be used in combinations other than the combinations explicitly described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. A device comprising an operating face of a front face of the device, wherein at least a substantial portion of the front face has a concave shape where long sides of the front face are straight and short sides of the front face are curved.

2. A device according to claim 1, wherein the front face has a first extent and a second extent and the operating face is concave in the second extent.

3. A device according to claim 2, wherein the first extent is larger than the second extent and wherein the front face is concave in the direction of the second extent.

4. A device according to claim 3, wherein the front face is a retracted surface that extends from edges of the front face that are substantially disposed in the direction of the first extent.

5. A device according to claim 1, wherein the housing of the device comprises a curved panel with a concave front face and a convex rear face.

6. A device according to claim 1, wherein the front face is an operating face.

7. A device according to claim 1, wherein the operating face comprises elements of a user interface.

8. A device according to claim 1, wherein the operating face includes a display screen, and wherein the surface of the display screen is concave.

9. A device according to claim 8, wherein the surface of the display screen has a curvature that substantially matches the curvature of the front panel.

10. A device according to claim 6, wherein the operating face includes a touch pad or touch screen, and wherein the surface of the touch pad or the touch screen is concave.

11. A device according to claim 10, wherein the surface of the touch pad or the touch screen has a curvature that substantially matches the curvature of the front panel.

12. A device according to claim 6, wherein the operating face includes a keypad, and wherein the surface of the keypad is concave.

13. A device according to claim 12, wherein the surface of the keypad has a curvature that substantially matches the curvature of the front panel.

14. A device according to claim 1, wherein the front surface is concave cylindrical.

15. A device according to claim 1, further comprising a printed wired board that is curved so as to substantially match the curvature of the front face.

16. A device according to claim 6, wherein the operating face includes a speaker outlet, and wherein the surface of the speaker outlet is concave.

17. A device according to claim 16, wherein the surface of the speaker outlet has a curvature that substantially matches the curvature of the front panel.

* * * * *